US007006104B2

(12) United States Patent
Nonaka

(10) Patent No.: US 7,006,104 B2
(45) Date of Patent: Feb. 28, 2006

(54) IMAGE CORRECTION METHOD AND SYSTEM

(75) Inventor: Shunichiro Nonaka, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 62 days.

(21) Appl. No.: 10/687,878

(22) Filed: Oct. 20, 2003

(65) Prior Publication Data
US 2004/0113864 A1   Jun. 17, 2004

(30) Foreign Application Priority Data
Oct. 29, 2002   (JP)   .............................. 2002-313640

(51) Int. Cl.
*H04N 17/00* (2006.01)
*G09G 3/36* (2006.01)
*G09G 5/02* (2006.01)

(52) U.S. Cl. ........................ 345/589; 345/597; 345/22; 345/88; 382/162; 382/167; 358/518

(58) Field of Classification Search ........ 345/589–594, 345/698, 3.3, 88, 22, 690; 358/515–520, 358/401, 406; 382/162, 167, 112
See application file for complete search history.

(56) References Cited

U.S. PATENT DOCUMENTS

| 5,926,617 | A  | * | 7/1999  | Ohara et al. ........... 358/1.9 |
| 6,292,157 | B1 | * | 9/2001  | Greene et al. .......... 345/1.3 |
| 6,677,958 | B1 | * | 1/2004  | Cottone et al. ......... 345/589 |
| 2002/0169805 | A1 | * | 11/2002 | Edge ................. 707/528 |

FOREIGN PATENT DOCUMENTS

JP   5-76036 A   3/1993

\* cited by examiner

*Primary Examiner*—Matthew C. Bella
*Assistant Examiner*—Wesner Sajous
(74) *Attorney, Agent, or Firm*—Birch, Stewart, Kolasch & Birch, LLP

(57) ABSTRACT

An image server transmits reference image data to a mobile telephone having a display device on which the reference image is displayed. A wavelength vs. luminance characteristic of the displayed reference image is measured by a radiance measurement unit, and a correction parameter for the mobile telephone is calculated based upon the measured wavelength vs. luminance characteristic. Processing for calculating correction parameters is executed with regard to other mobile telephones as well. If an image-data transmit request is issued by a mobile telephone, the image data is corrected using the correction parameter that corresponds to the mobile telephone. The corrected image data is transmitted to the mobile telephone. Since a correction suited to the mobile telephone is carried out, an excellent image is displayed on the display screen of the mobile telephone.

6 Claims, 6 Drawing Sheets

*Fig. 3*

| MOBILE TELEPHONE | | CORRECTION PARAMETER | |
|---|---|---|---|
| | | TONE CORRECTION | COLOR CORRECTION |
| α Co. | a101 | LUT1 | Matrix1 |
| α Co. | b201 | LUT2 | Matrix2 |
| β Co. | 3c | LUT3 | Matrix3 |
| β Co. | 4d | LUT4 | Matrix4 |
| ⋮ | | ⋮ | ⋮ |

IMAGE CORRECTION METHOD AND SYSTEM

This nonprovisional application claims priority under 35 U.S.C. § 119(a) on Patent Application No. 2002-313640 filed in JAPAN on Oct. 29, 2002, which is herein incorporated by reference.

BACKGROUND OF THE INVENTION

1. Field of the Invention

This invention relates to a method and system for correcting an image.

2. Description of the Related Art

A display device has been designed so as to satisfy the relation $X=Y\gamma$, where X represents an input value and Y represents an output value, and $\gamma=2.2$ holds. To achieve this, image data representing an image to be displayed on the display device is adjusted so as to obtain excellent image quality when an image is displayed on the display device in such a manner that the image characteristic will satisfy the equation cited above. However, depending upon the display device, there are instances where the image data obtained by the sensing of an image does not satisfy the above equation. In such cases, the image is subjected to a tone correction (e.g., see the specification of Japanese Patent Application Laid-Open No. 5-76036).

The popularization of mobile telephones has been accompanied by the ability to display images on the display screen of such telephones. There are instances where the above equation cannot be satisfied for certain reasons, such as illumination of the display screen by backlighting. This has made it necessary to implement a better image correction.

DISCLOSURE OF THE INVENTION

Accordingly, an object of the present invention is to perform an appropriate image correction.

According to the present invention, the foregoing object is attained by providing an image correction method comprising the steps of: displaying for every image display device, a reference image on a display screen of each image display device; measuring a display characteristic for every image display device based upon the displayed reference image; calculating, for every image display device, a correction parameter, which corrects the image displayed on the display screen of the image display device, based upon the measured display characteristic; correcting image data, which represents an image to be displayed on the display screen of an image display device, using a corresponding correction parameter from among the calculated correction parameters; and applying the corrected image data to the corresponding image display device.

The present invention also provides a system suited to the image correction method described above. Specifically, an image correction system according to the present invention comprises: a measurement device for measuring, for every image display device, a display characteristic based upon a displayed reference image, for every image display device, on a display screen of each image display device; a correction parameter calculation device for calculating, for every image display device, a correction parameter, which corrects the image displayed on the display screen of the image display device, based upon the display characteristic measured by the measurement device; and a correction device for correcting image data, which represents an image to be displayed on the display screen of an image display device, using a corresponding correction parameter from among the correction parameters calculated by the correction parameter calculation device.

In accordance with the present invention, a reference image is displayed, for every image display device, on the display screen of each image display device. A display characteristic is measured for every image display device based upon the displayed reference image, and a correction parameter is calculated for every image display device based upon the measured display characteristic. Image data representing an image to be displayed on the display screen of an image display device is corrected using the corresponding correction parameter from among the calculated correction parameters. The corrected image data is applied to the corresponding image display device.

The image data applied to the image display device thus undergoes a correction conforming to the display characteristic of the image display device. Thus, an excellent image that conforms to the image display device is displayed.

By way of example, the image display device is an electronic device (e.g., a mobile telephone equipped with a display device) having a communication function. In such case, in accordance with an image-data transmit request issued by the above-mentioned electronic device, the type of electronic device that issued the transmit request, or the type of display device thereof, would be found, and the correction processing mentioned above would be processing for correcting image data, which represents an image to be displayed on the image display device of the above-mentioned electronic device, using a correction parameter corresponding to the found type from among the correction parameters that have been calculated.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a table illustrating an example of correction parameters;

DESCRIPTION OF THE PREFERRED EMBODIMENT

A preferred embodiment of the present invention will now be described in detail with reference to the accompanying drawings.

This embodiment is for correcting an image in dependence upon type of mobile telephone in a case where an image is displayed on the mobile telephone, which is equipped with a display device. First, a correction parameter is calculated for every type of mobile telephone. Then a correction parameter that corresponds to the display screen of the mobile telephone that displays the image is found from among these calculated correction parameters, and the image data is corrected using the correction parameter that has been found. The corrected image data is transmitted to the mobile telephone.

Figure 1:
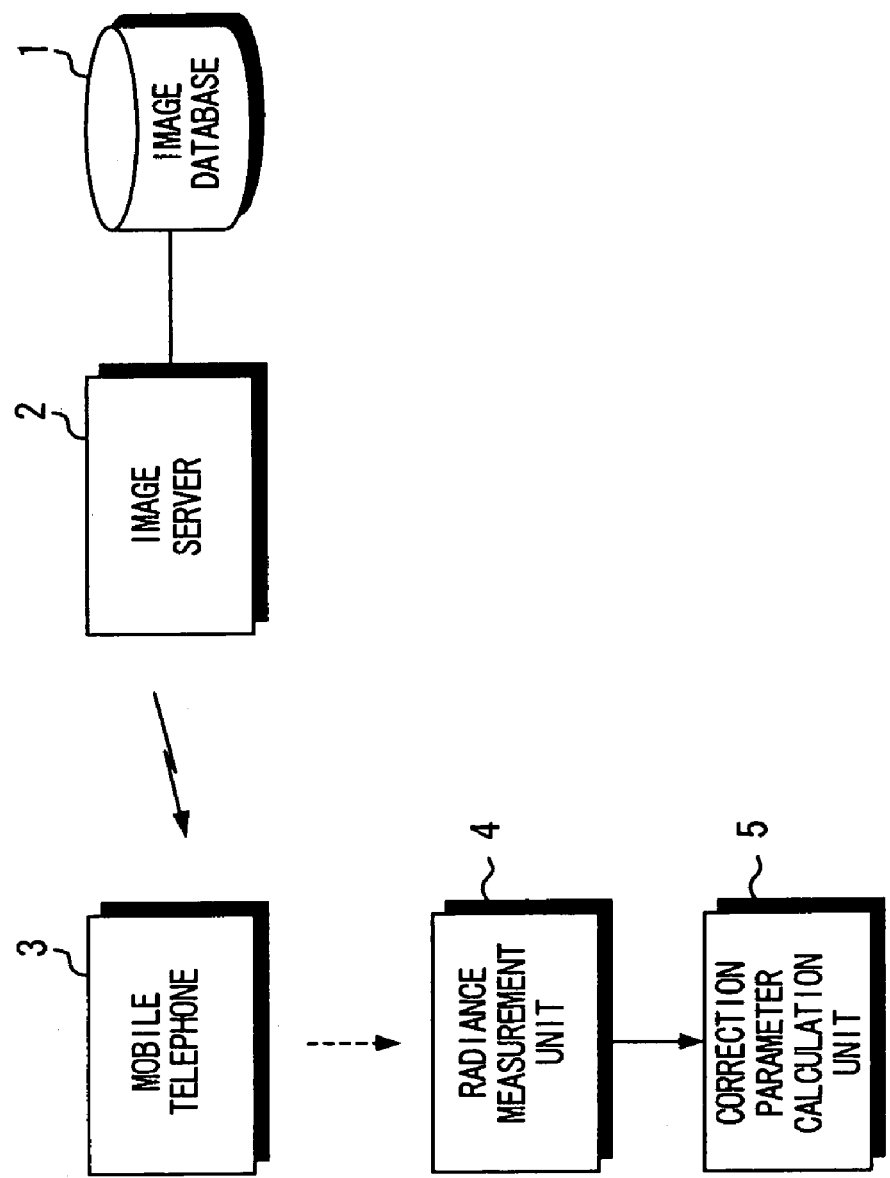
FIG. 1 is a block diagram illustrating a system for calculating correction parameters.

FIG. 1 illustrates an overview of a system that calculates correction parameters.

Image data representing single-color reference images of the colors "RED", "BLUE", "GREEN", "WHITE", "BLACK" and "GRAY" has been stored in an image database 1. Image data representing these reference images is read from the image database 1 and applied to an image server 2.

The image data representing the reference images is transmitted from the image server 2 to a mobile telephone 3. When the image data representing the reference images is received by the mobile telephone 3, the latter is taken to a radiance measurement unit 4.

The single-color reference images of the colors "RED", "BLUE", "GREEN", "WHITE", "BLACK" and "GRAY" are displayed on the display screen of the display unit of mobile telephone 3. The luminance of each of the reference images is measured by the radiance measurement unit 4.

Figure 2:
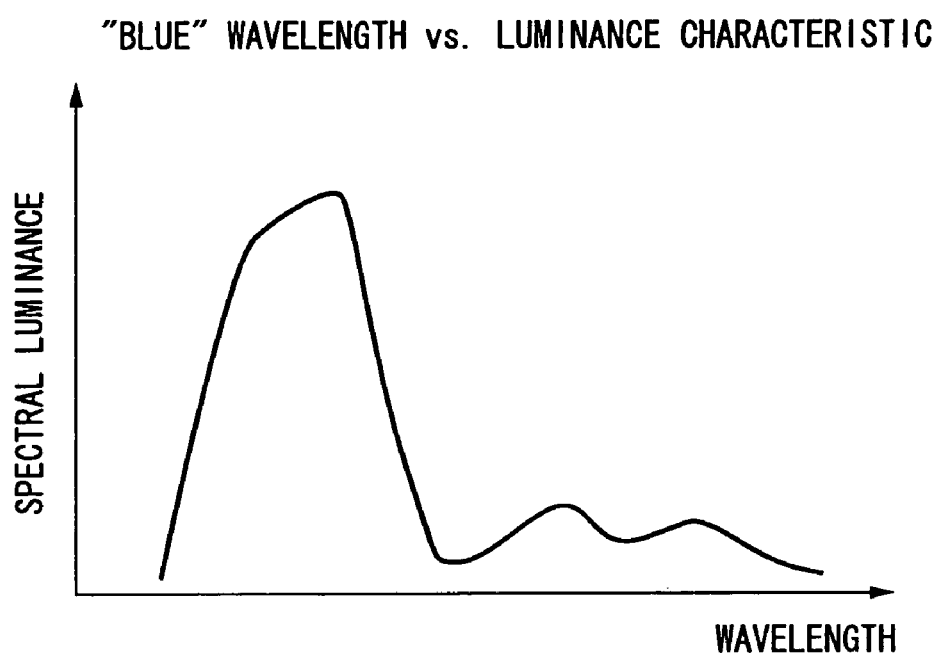
FIG. 2 is a graph illustrating an example of a wavelength vs. luminance characteristic.

FIG. 2 illustrates an example of measurement data obtained in a case where the reference image of the color "BLUE" is displayed on the mobile telephone 3. Since the reference image is for the color "BLUE", the luminance level is high at comparatively short wavelengths and low at other wavelengths.

All of the reference images are displayed on the mobile telephone 3 in succession and wavelength vs. luminance characteristics of the kind shown in FIG. 2 are measured by the radiance measurement unit 4 in regard to each of the reference images. The data measured for each reference image is applied to a correction parameter calculation unit 5.

Data representing ideal wavelength vs. luminance characteristics of the single-color reference images of the colors "RED", "BLUE", "GREEN", "WHITE", "BLACK" and "GRAY", which have been stored in the image database 1, are set beforehand in the correction parameter calculation unit 5. On the basis of the difference between the waveform vs. luminance characteristic obtained from the radiance measurement unit 4 and the ideal wavelength vs. luminance characteristic data, the correction parameter calculation unit 5 calculates, as a correction parameter, a LUT (a look-up table, namely a table having 256 grayscale values) for performing a tone correction (in such a manner that the ideal wavelength vs. luminance characteristic will be obtained when the reference image is displayed) and a matrix for performing a color correction.

Such processing for calculating a correction parameter is executed on a per-mobile-telephone basis.

FIG. 3 shows a table illustrating correction parameters.

As mentioned above, a correction parameter includes a parameter for a tone correction and a parameter for a color correction. The tone-correction parameter and the color correction parameter are calculated for every type of mobile telephone.

For example, if a mobile telephone is manufactured by Company α and is model a101 (Company α, a101), then the tone-correction parameter is "LUT1" and the color-correction parameter is "Matrix1". The tone-correction parameter and color-correction parameter are calculated for every type of mobile telephone in regard to the other mobile telephones as well.

An image is subjected to a tone correction by multiplying the luminance component of the image to be corrected by the tone-correction parameter. Further, a color correction is carried out by performing a matrix operation between the RGB components of each pixel of the image to be corrected and the color-correction parameter.

Figure 4:
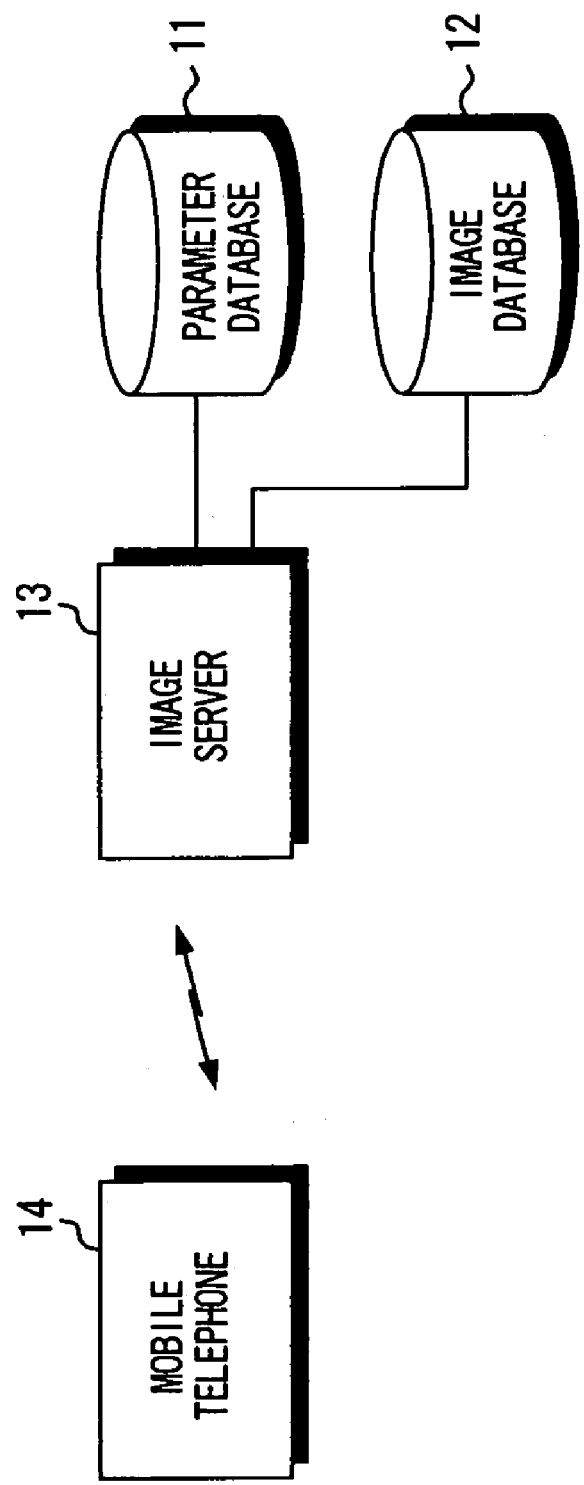
FIG. 4 is a block diagram illustrating a system for correcting an image.

FIG. 4 illustrates an overview of a system for performing correction processing.

A parameter database 11 and an image database 12 are connected to an image server 13. A correction parameter that has been calculated in the manner described above has been stored for every model of mobile telephone in the parameter database 11. Further, image data representing images of a number of frames has been stored in the image database 12.

A mobile telephone 14 sends the image server 13 a request to transmit image data. When this transmit request is issued, data indicating the model of mobile telephone 14 also is transmitted from the mobile telephone 14 to the image server 13.

The image server 13 searches the image database 12 to find image data conforming to the transmit request from the mobile telephone 14. Further, the image server 13 reads the correction parameter corresponding to the model of mobile telephone 14 from the parameter database 11. The image data that has been found from the image database 12 is corrected using the correction parameter that has been read from the parameter database 11. The details of correction processing are as follows:

First, luminance data and color difference data is generated from the image data that has been read from the image database 12. The luminance data of the generated luminance data and color difference data is multiplied by the tone-correction parameter (that is, a tone correction is applied). It goes without saying that the correction may be applied by a different method. Furthermore, RGB image data is generated from the tone-corrected luminance data and generated color difference data. A matrix operation is applied to the generated RGB image data using the corresponding color-correction parameter (that is, a color correction is applied). The image data thus corrected is transmitted from the image server 13 to the mobile telephone 14.

Figure 5:
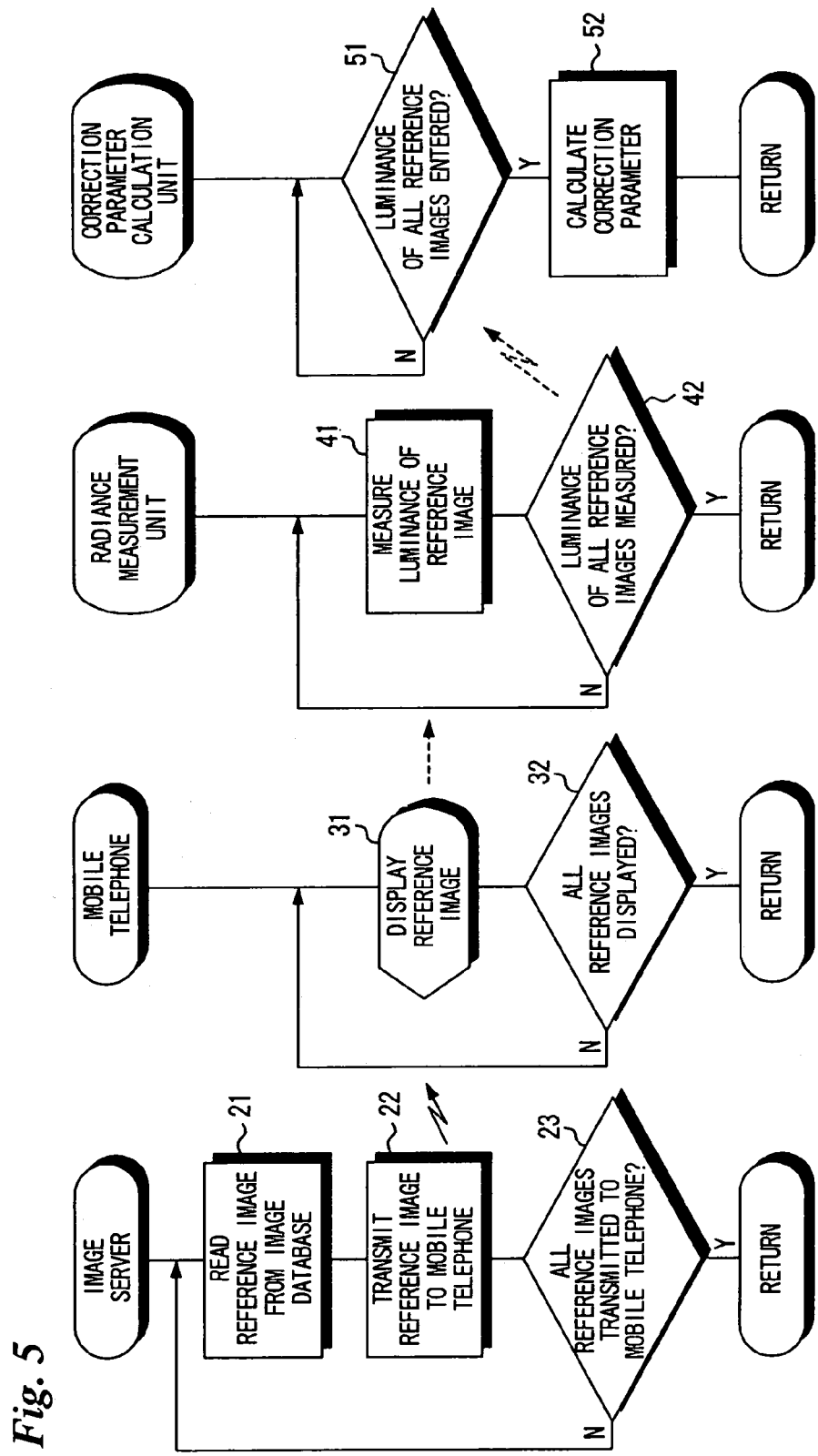
FIG. 5 is a flowchart illustrating processing for calculating a correction parameter.

FIG. 5 is a flowchart illustrating processing for calculating a correction parameter.

As mentioned above (in connection with FIG. 1), image data representing a reference image that has been stored in the image database 1 is read out of the database 1 (step 21). The image data representing the read reference image is transmitted from the image server 2 to the mobile telephone 3 (step 22). The processing for reading the reference-image data and transmitting it to the mobile telephone 3 is repeated until image data representing all of the reference images that have been stored in the image database 1 is transmitted from the image server 2 to the mobile telephone 3 (step 23).

When reference-image data is transmitted from the image server 2 to the mobile telephone 3, the reference image is displayed on the display screen of the mobile telephone 3 (step 31). The mobile telephone 3 on which the reference image has been displayed is taken to the radiance measurement unit 4, which proceeds to measure the wavelength vs. luminance characteristic of the reference image being displayed (step 41). The processing for displaying (step 32) and measuring the reference image on the display screen of the mobile telephone 3 is repeated until the wavelength vs. luminance characteristics of all of the reference images have been measured (step 42).

When the wavelength vs. luminance characteristics of all of the reference images have been measured by the radiance measurement unit 4, all of the data representing the measured wavelength vs. luminance characteristics is input to the correction parameter calculation unit 5 (step 51). On the basis of the input data, the correction parameter calculation unit 5 calculates a tone-correction parameter and color-correction parameter (step 52).

Figure 6:
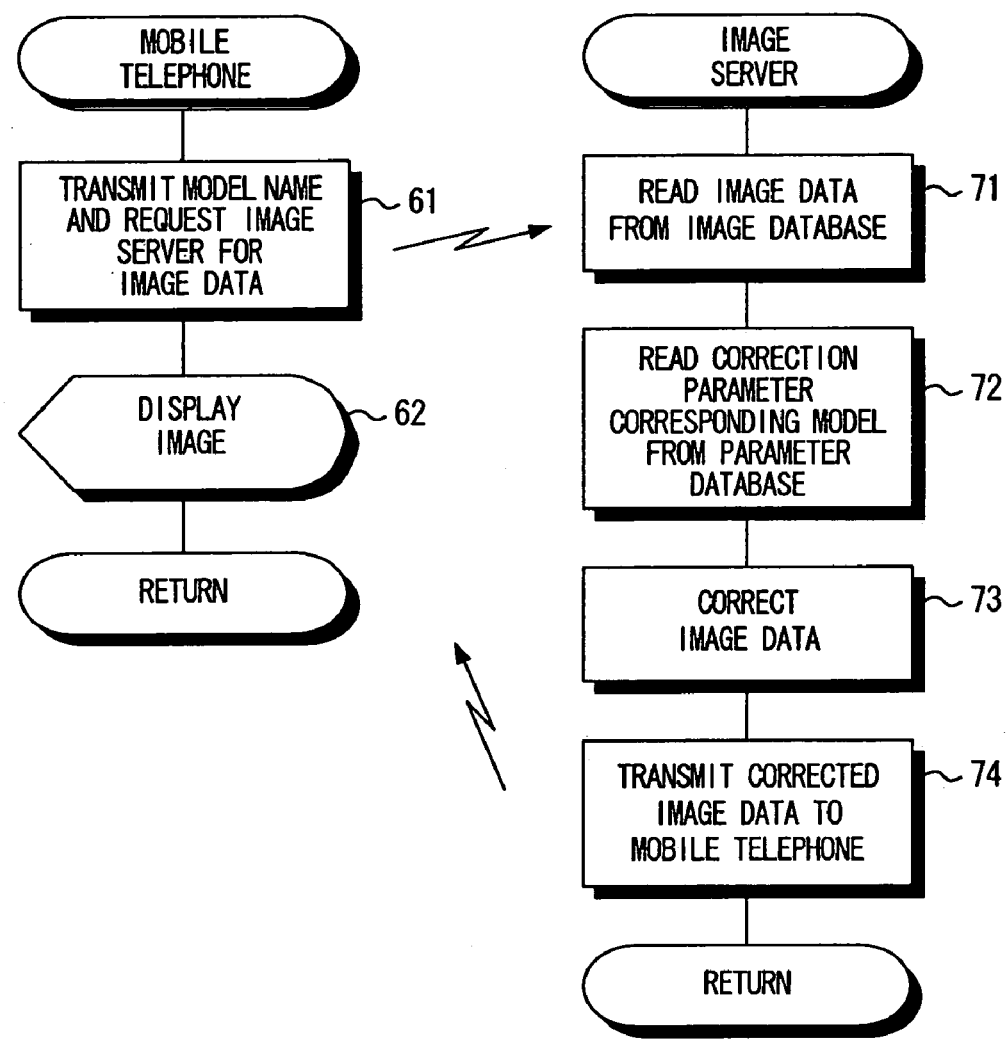
FIG. 6 is a flowchart illustrating image correction processing.

FIG. 6 is a flowchart illustrating correction processing using the calculated correction parameters.

As mentioned above (in connection with FIG. 4), the mobile telephone 14 and image server 13 are linked. Data indicating the name of the model of mobile telephone 14 and a request to transmit image data are sent from the mobile telephone 14 to the image server 13 (step 61).

Upon receiving the data indicating the name of the model of mobile telephone 14 and the request to transmit image data, the image server 13 reads the image data whose transmission has been requested out of the image database 12 (step 71). The correction parameter corresponding to the model of mobile telephone 14 is read from the parameter database 11 by the image server 13 (step 72). The image server 13 corrects the image data using the read correction parameter (namely the tone-correction parameter and color-correction parameter) (step 73). The corrected image data is transmitted from the image server 13 to the mobile telephone 14 (step 74).

Upon receiving the image data transmitted from the image server 13, the mobile telephone 14 displays the image, which is represented by the received image data, on the display screen of the display device of mobile telephone 14 (step 62). Since the displayed image is one that has been corrected in conformity with the display device of the mobile telephone 14, it will exhibit the proper brightness and color. An excellent image is displayed.

In the embodiment described above, both a tone correction and a color correction are applied. However, both corrections need not necessarily be applied, and it may be so arranged that only one is applied.

As many apparently widely different embodiments of the present invention can be made without departing from the spirit and scope thereof, it is to be understood that the invention is not limited to the specific embodiments thereof except as defined in the appended claims.

What is claimed is:

1. An image correction method comprising:
    displaying, for a plurality of image display devices, a reference color image on a display screen of each image display device within the plurality of image display devices;
    measuring a display characteristic for each image display device based upon the displayed reference color image;
    calculating, for each image display device, a color correction parameter, which corrects the color image displayed on the display screen of each image display device, based upon the measured display characteristic;
    color correcting color image data, for each image display device, which represents a color image to be displayed on the display screen of a corresponding image display device, using a corresponding color correction parameter from among the calculated color correction parameters; and
    applying the color corrected image data to the corresponding image display device.

2. The method according to claim 1, wherein the image display device is an electronic device having a communication function;
    in response to an image-data transmit request from said electronic device, the type of electronic device that issued the transmit request, or the type of display device thereof, is found; and
    processing for correcting the image data includes correcting the image data, which represents the image to be displayed on the image display device of said electronic device, using a correction parameter, which corresponds to the found type, from among the calculated correction parameters.

3. An image correction system comprising:
    a measurement device for measuring, for a plurality of image display devices, a display characteristic based upon a displayed reference color image, for each image display device within the plurality of image display devices, on a display screen of each image display device;
    a correction parameter calculation device for calculating, for each image display device, a color correction parameter, which corrects the color image displayed on the display screen of each image display device, based upon the display characteristic measured by said measurement device; and
    a correction device for correcting color image data, which represents a color image to be displayed on the display screen of a corresponding image display device, using a corresponding color correction parameter from among the color correction parameters calculated by said correction parameter calculation device.

4. The system according to claim 3, wherein the image display device is an electronic device having a communication function;
    said system further comprising a retrieval device for finding, in response to an image-data transmit request from said electronic device, the type of electronic device that issued the transmit request, or the type of display device thereof;
    said correction device correcting the image data, which represents the image to be displayed on the image display device of said electronic device, using a correction parameter, which corresponds to the type found by said retrieval device, from among the correction parameters calculated by said correction parameter calculation device.

5. The method according to claim 1, wherein the plurality of image display devices includes every image display device.

6. The system according to claim 3, wherein the plurality of image display devices included every image display device.

* * * * *